Nov. 16, 1926.  1,607,187
E. J. DILL ET AL
METHOD OF ATTACHING SPIDERS TO HANDWHEEL RIMS
Filed Feb. 18, 1925

Inventor
Edward J. Dill
Alva W. Scott

By Spencer Sewall & Hardman
his Attorneys

Patented Nov. 16, 1926.

1,607,187

UNITED STATES PATENT OFFICE.

EDWARD J. DILL AND ALVA W. SCOTT, OF DAYTON, OHIO, ASSIGNORS TO THE INLAND MANUFACTURING COMPANY, OF DAYTON, OHIO, A CORPORATION OF DELAWARE.

METHOD OF ATTACHING SPIDERS TO HANDWHEEL RIMS.

Application filed February 18, 1925. Serial No. 10,085.

This invention relates to the manufacture of hand-wheels especially such as are adapted for use as steering wheels for automotive vehicles.

An object of this invention is to provide a simple and efficient method of securing the spider to a molded rim of composition material.

Another object is to provide a simple method of concealing the screws or bolts by which a pressed metal spider is attached to a handwheel rim.

Further objects and advantages of the present invention will be apparent from the following description, reference being had to the accompanying drawings, wherein a preferred form of embodiment of the present invention is clearly shown.

In the drawings.

In the drawings, like or similar reference characters refer to like or similar parts throughout the several views.

Figure 1:
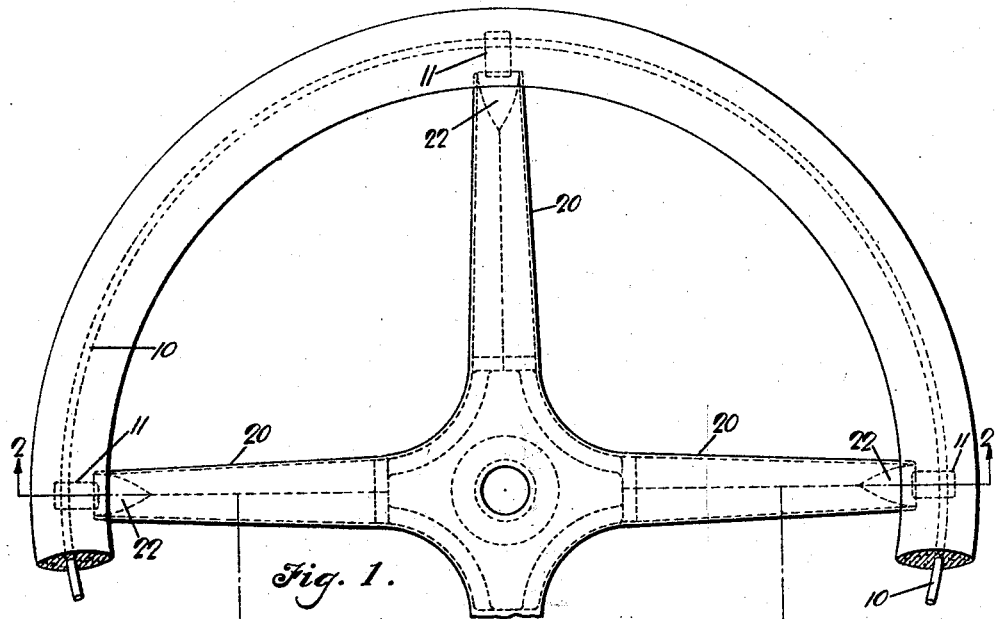
Fig. 1 is a top plan view of an automobile steering wheel built according to this invention.
Figure 2:
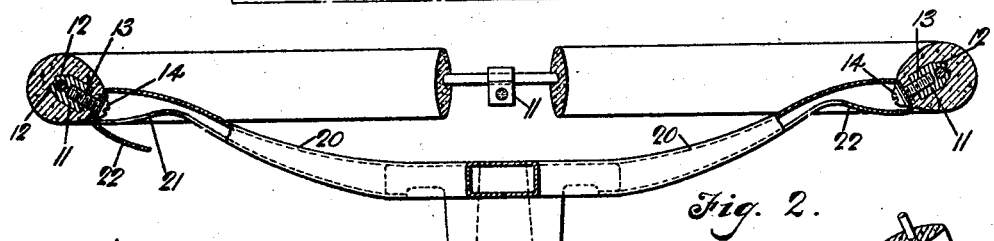
Fig. 2 is a sectional view showing how the spider arms are secured to the rim by means of concealed screws.
Figure 3:
Fig. 3 is a bottom plan view of the outer end of one spider arm and a portion of the rim.

In the manufacture of the wheel of Figs. 1 to 3, a metal hoop 10, preferably of 3/16 inch steel wire, has its ends welded together to form a quite rigid and self-sustaining ring, yet one which is sufficiently yieldable to absorb shocks without danger of breaking. To this hoop 10 there is attached four equally spaced anchor members 11, each of which is provided with two malleable lugs 12 which are bent around the hoop 10 thus securing the members 11 thereto. The members 11 are also provided with threaded recesses 13 to later receive the screws 14 by which the spider is secured to the rim.

A length of unvulcanized rubber rim stock having a continuous longitudinal slit therein is now laid around the hoop 10, the hoop and anchor members 11 being received in the slit, and the rubber is pressed firmly around the hoop so that it adheres thereto and is thus held in place in ring form so that the rim unit may be handled until it is placed in a vulcanizing mold. The method of forming such slitted rim stock and of laying it on the hoop member is illustrated and described in greater detail and claimed in a copending application, Serial No. 10,153, filed February 18, 1925.

Before placing the rim unit in a vulcanizing mold temporary screws are screwed into recesses 13 in the anchor members 11. The projecting ends of these temporary screws are used to correctly align the anchor members 11 which may be forced to rotate about the hoop 10. Preferably the vulcanizing mold is provided with recesses for receiving the projecting ends of the temporary screws so that when the rim unit is laid in the mold these projecting ends fall within said recesses and automatically align all four of the anchor members 11 to their correct positions. These temporary screws remain in place during the vulcanization of the rim under suitable heat and pressure. During vulcanization the edges of the longitudinal slit are vulcanized together forming an integral structure and the rubber flows closely up around the inserted anchor members 11 and the temporary screws. After vulcanization the rim is removed from the mold, the temporary screws unscrewed from the threaded recesses 13, and the rim given the desired buffing and polishing before the spider is attached thereto. Obviously such buffing and polishing may be very much more easily done where there is no spider to interfere with such work than where the spider arms are molded in place in the rubber rim.

The metal spider is next firmly secured to the finished rim by being screwed thereto by the screws 14 which are threaded into the metal anchor members 11, as clearly shown. Of course any suitable type of screwed on spider may be used, but there has been illustrated a preferred type wherein the screw heads are concealed in the finished spider. The spider arms 20 are formed from pressed sheet metal into a box section with a triangular opening 21 on the under side of the outer ends thereof to permit the insertion of the screws 14 and the use of a screw-driver thereupon, as clearly shown in Fig. 2. A triangular tongue 22 is provided by folding back the outer end of the metal of which the arm is formed, this tongue being left bent in the position shown on the left side of Fig. 2 until after the screw 14 is secured in place. The tongue 22 is then bent in to substantially close the triangular opening 21, as clearly shown on the right side of Fig. 2. By this means the spider retaining screws are completely concealed and the spider has the appearance of one having the spider arms inserted and molded in place in the rim.

Figure 4:
Fig. 4 is a sectional view showing a modification in which there is no reinforcing member in the rim.
Figure 5:
Fig. 5 is a bottom plan view of the modification of Fig. 4.

In Figs. 4 and 5 a modification is shown wherein no reinforcing hoop is used in the molded rubber rim. In this form the threaded anchor members 11' are supported accurately in place in the mold by temporary screws having projecting ends which are rigidly supported upon some part of the mold. The unvulcanized rim stock is laid in the mold about the anchor members 11, having been provided with recesses or slots which receive the members 11 and the temporary screws and permit the rubber stock to lie fairly closely around these parts. During vulcanization the rubber flows up very snugly around these inserted parts and is vulcanized thereto. After vulcanization the temporary screws are removed as described above, the rim is sanded and polished, and the spider is then attached by screws extending into the anchor members 11'.

In the form shown in either Fig. 2 or Fig. 4, if desired, instead of a temporary screw member being used to align the anchor members in the mold as above described, an unthreaded temporary member may be used which fits snugly within the threaded recesses 13 in the anchor members.

Also the anchor members 11 or 11' may be of such dimensions that they extend to the surface of the rim on the inner periphery thereof and held in place during vulcanization by either form of temporary member as hereinabove described. In such cases the exposed surface of the anchor member is concealed by the end of the spider arm which abuts thereagainst and is secured thereto by the screw 14.

A further modified form of molded in anchor member which may be used, if desired, is provided with a projecting threaded stud which projects beyond the inner periphery of the rim and to which the spider arm may be directly secured by having a nut threaded thereupon. This nut preferably is provided with a screw-driver slot and is secured in place by means of a screw-driver in the same manner in which screws 14 are secured in place. The tongue 22 is then bent down to conceal the nut in the same manner as with the screws 14.

While the forms of embodiment of the present invention as herein disclosed, constitute preferred forms, it is to be understood that other forms might be adopted, all coming within the scope of the claims which follow.

What is claimed is as follows:

1. The method of securing spider arms to a handwheel rim comprising: providing a spider having substantially box section arms with a portion of one side of said box section bent outwardly to form an opening to permit a screw to be inserted within said box section and to permit access to the screw with a screw-driver, inserting screws through said openings and screwing said screws to the rim by means of a screw-driver also inserted through said openings, and then bending the outwardly bent portion to conceal the screw heads and close said opening.

2. The method of securing spider arms to a handwheel rim comprising: providing a spider having substantially box section arms with a tongue adjacent the outer ends thereof bent downwardly to expose the end wall of said box section, securing the spider to the rim by headed screws passing through said end walls of the box section arms, and then bending said tongue substantially flush with said box section to enclose and conceal the screw heads.

3. A handwheel comprising: a molded rim having an endless reinforcing metal hoop therein, a plurality of anchor members secured to said hoop by malleable lugs on said anchor members bent around said hoop, said anchor members being molded in the rim material, and a metal spider having the outer ends of the arms thereof secured to said anchor members.

In testimony whereof we hereto affix our signatures.

EDW. J. DILL.
ALVA W. SCOTT.